US 8,954,385 B2
Feb. 10, 2015

(12) United States Patent
George et al.

(10) Patent No.: US 8,954,385 B2
(45) Date of Patent: Feb. 10, 2015

(54) EFFICIENT RECOVERY OF TRANSACTIONAL DATA STORES

(75) Inventors: Johann George, Sunnyvale, CA (US); Darpan Dinker, Union City, CA (US); Manavalan Krishnan, Fremont, CA (US); Brian W. O'Krafka, Austin, TX (US)

(73) Assignee: SanDisk Enterprise IP LLC, Milpitas, CA (US)

( * ) Notice: Subject to any disclaimer, the term of this patent is extended or adjusted under 35 U.S.C. 154(b) by 3 days.

(21) Appl. No.: 13/170,955

(22) Filed: Jun. 28, 2011

(65) Prior Publication Data

US 2012/0005154 A1    Jan. 5, 2012

Related U.S. Application Data

(60) Provisional application No. 61/359,237, filed on Jun. 28, 2010.

(51) Int. Cl.
*G06F 17/30* (2006.01)
*G06F 7/00* (2006.01)

(52) U.S. Cl.
CPC .... *G06F 17/30581* (2013.01); *G06F 17/30578* (2013.01)
USPC .......................................... 707/617; 707/724

(58) Field of Classification Search
CPC ................... G06F 17/30088; G06F 17/30144; G06F 17/30174; G06F 17/30194
See application file for complete search history.

(56) References Cited

U.S. PATENT DOCUMENTS

| | | | |
|---|---|---|---|
| 4,916,605 A | 4/1990 | Beardsley et al. | |
| 5,046,002 A | 9/1991 | Takashi et al. | |
| 5,057,996 A | 10/1991 | Cutler et al. | |
| 5,117,350 A | 5/1992 | Parrish et al. | |

(Continued)

FOREIGN PATENT DOCUMENTS

| | | |
|---|---|---|
| EP | 1548600 B1 | 1/2007 |
| EP | 1746510 A1 | 1/2007 |

OTHER PUBLICATIONS

Amza et al., "Data Replication Strategies for Fault Tolerance and Availability on Commodity Clusters", Proceedings International Conference on Dependable Systems and Networks, pp. 459-467, IEEE, 2000.*

(Continued)

*Primary Examiner* — Michael Hicks
(74) *Attorney, Agent, or Firm* — Morgan, Lewis & Bockius LLP

(57) ABSTRACT

Approaches for recovering a node of a distributed transactional system. When a recovering node is being brought online, a copy of at least a portion of a first data store maintained by an existing node is created without ceasing to process transactions against the first data store at the existing node. The recovering node creates a second data store based on the copy of the first data store. While the recovering node creates the second data store, the recovering node stores committed transaction data received from a plurality of nodes. The committed transaction data describes transactions committed against data stores maintained by the sender of the committed transaction data. The recovering node may thereafter replay, against the second data store, any transactions identified by the committed transaction data that are associated with a global transaction number that is more recent than is a reference commit number.

20 Claims, 9 Drawing Sheets

(56) References Cited

U.S. PATENT DOCUMENTS

| | | |
|---|---|---|
| 5,212,789 A | 5/1993 | Rago |
| 5,287,496 A | 2/1994 | Chen et al. |
| 5,297,258 A | 3/1994 | Hale et al. |
| 5,394,555 A | 2/1995 | Hunter et al. |
| 5,403,639 A | 4/1995 | Belsan et al. |
| 5,423,037 A | 6/1995 | Hvasshovd |
| 5,509,134 A | 4/1996 | Fandrich et al. |
| 5,537,534 A | 7/1996 | Voigt et al. |
| 5,603,001 A | 2/1997 | Sukegawa et al. |
| 5,611,057 A | 3/1997 | Pecone et al. |
| 5,613,071 A | 3/1997 | Rankin et al. |
| 5,680,579 A | 10/1997 | Young et al. |
| 5,692,149 A | 11/1997 | Lee |
| 5,701,480 A | 12/1997 | Raz |
| 5,742,787 A | 4/1998 | Talreja |
| 5,887,138 A | 3/1999 | Hagersten et al. |
| 5,897,661 A | 4/1999 | Baranovsky et al. |
| 5,897,664 A | 4/1999 | Nesheim et al. |
| 5,960,436 A * | 9/1999 | Chang et al. ............ 1/1 |
| 5,963,983 A | 10/1999 | Sakakura et al. |
| 6,000,006 A | 12/1999 | Bruce et al. |
| 6,023,745 A | 2/2000 | Lu |
| 6,052,815 A | 4/2000 | Zook |
| 6,130,759 A | 10/2000 | Blair |
| 6,141,692 A | 10/2000 | Loewenstein et al. |
| 6,151,688 A | 11/2000 | Wipfel et al. |
| 6,216,126 B1 | 4/2001 | Ronstrom |
| 6,298,390 B1 | 10/2001 | Matena et al. |
| 6,308,169 B1 | 10/2001 | Ronstrom et al. |
| 6,434,144 B1 | 8/2002 | Romanov |
| 6,467,060 B1 | 10/2002 | Malakapalli et al. |
| 6,615,313 B2 | 9/2003 | Kato et al. |
| 6,658,526 B2 | 12/2003 | Nguyen et al. |
| 6,728,826 B2 | 4/2004 | Kaki et al. |
| 6,745,209 B2 * | 6/2004 | Holenstein et al. ........... 707/615 |
| 6,804,766 B1 | 10/2004 | Noel et al. |
| 6,874,044 B1 | 3/2005 | Chou et al. |
| 6,938,084 B2 | 8/2005 | Gamache et al. |
| 6,944,699 B1 | 9/2005 | Bugnion et al. |
| 6,981,070 B1 | 12/2005 | Luk et al. |
| 7,003,586 B1 | 2/2006 | Bailey et al. |
| 7,010,521 B2 | 3/2006 | Hinshaw et al. |
| 7,043,621 B2 | 5/2006 | Merchant et al. |
| 7,082,481 B2 | 7/2006 | Lambrache et al. |
| 7,162,467 B2 | 1/2007 | Eshleman et al. |
| 7,200,718 B2 | 4/2007 | Duzett |
| 7,203,890 B1 | 4/2007 | Normoyle |
| 7,249,280 B2 | 7/2007 | Lamport et al. |
| 7,251,749 B1 * | 7/2007 | Fong et al. ............ 714/20 |
| 7,269,708 B2 | 9/2007 | Ware |
| 7,269,755 B2 | 9/2007 | Moshayedi et al. |
| 7,272,605 B1 | 9/2007 | Hinshaw et al. |
| 7,272,654 B1 | 9/2007 | Brendel |
| 7,281,160 B2 | 10/2007 | Stewart |
| 7,305,386 B2 | 12/2007 | Hinshaw et al. |
| 7,334,154 B2 | 2/2008 | Lorch et al. |
| 7,359,927 B1 | 4/2008 | Cardente |
| 7,383,290 B2 | 6/2008 | Mehra et al. |
| 7,406,487 B1 | 7/2008 | Gupta et al. |
| 7,415,488 B1 | 8/2008 | Muth et al. |
| 7,417,992 B2 * | 8/2008 | Krishnan ............ 370/395.41 |
| 7,467,265 B1 | 12/2008 | Tawri et al. |
| 7,529,882 B2 | 5/2009 | Wong |
| 7,542,968 B2 | 6/2009 | Yokomizo et al. |
| 7,562,162 B2 | 7/2009 | Kreiner et al. |
| 7,584,222 B1 | 9/2009 | Georgiev |
| 7,610,445 B1 | 10/2009 | Manus et al. |
| 7,623,494 B2 | 11/2009 | Zhu et al. |
| 7,627,618 B2 | 12/2009 | Honigfort |
| 7,647,449 B1 | 1/2010 | Roy et al. |
| 7,657,710 B2 | 2/2010 | Loewenstein |
| 7,809,691 B1 | 10/2010 | Karmarkar et al. |
| 7,822,711 B1 | 10/2010 | Ranade |
| 7,885,923 B1 | 2/2011 | Tawri et al. |
| 7,917,472 B2 | 3/2011 | Persson |
| 8,015,352 B2 | 9/2011 | Zhang et al. |
| 8,018,729 B2 | 9/2011 | Skinner |
| 8,024,515 B2 | 9/2011 | Auerbach et al. |
| 8,037,349 B2 | 10/2011 | Mandagere et al. |
| 8,069,328 B2 | 11/2011 | Pyeon |
| 8,099,391 B1 * | 1/2012 | Monckton ............ 707/647 |
| 8,103,643 B2 * | 1/2012 | Danilov et al. ............ 707/704 |
| 8,161,248 B2 | 4/2012 | Blumrich et al. |
| 8,205,206 B2 | 6/2012 | Özer et al. |
| 8,225,053 B1 | 7/2012 | McCorkendale et al. |
| 8,239,617 B1 | 8/2012 | Linnell |
| 8,261,266 B2 | 9/2012 | Pike et al. |
| 8,261,289 B2 | 9/2012 | Kasravi et al. |
| 8,321,450 B2 | 11/2012 | Thatte et al. |
| 8,335,776 B2 | 12/2012 | Gokhale |
| 8,370,853 B2 | 2/2013 | Giampaolo et al. |
| 8,401,994 B2 | 3/2013 | Hoang et al. |
| 8,504,526 B2 * | 8/2013 | Gokhale et al. ............ 707/648 |
| 8,666,939 B2 * | 3/2014 | O'Krafka et al. ............ 707/615 |
| 8,671,074 B2 * | 3/2014 | Wang et al. ............ 707/634 |
| 2001/0032253 A1 | 10/2001 | Duxbury |
| 2002/0089933 A1 | 7/2002 | Giroux et al. |
| 2002/0129192 A1 | 9/2002 | Spiegel et al. |
| 2002/0166031 A1 | 11/2002 | Chen et al. |
| 2002/0184239 A1 | 12/2002 | Mosher, Jr. et al. |
| 2003/0016596 A1 | 1/2003 | Chiquoine et al. |
| 2003/0097610 A1 | 5/2003 | Hofner |
| 2003/0177408 A1 | 9/2003 | Fields et al. |
| 2003/0220985 A1 | 11/2003 | Kawamoto et al. |
| 2004/0010502 A1 | 1/2004 | Bomfim et al. |
| 2004/0078379 A1 | 4/2004 | Hinshaw et al. |
| 2004/0143562 A1 | 7/2004 | Chen et al. |
| 2004/0148283 A1 | 7/2004 | Harris et al. |
| 2004/0172494 A1 | 9/2004 | Pettey et al. |
| 2004/0172577 A1 | 9/2004 | Tan et al. |
| 2004/0205151 A1 | 10/2004 | Sprigg et al. |
| 2004/0230862 A1 | 11/2004 | Merchant et al. |
| 2004/0267835 A1 | 12/2004 | Zwilling et al. |
| 2005/0005074 A1 | 1/2005 | Landin et al. |
| 2005/0021565 A1 | 1/2005 | Kapoor et al. |
| 2005/0027701 A1 | 2/2005 | Zane et al. |
| 2005/0028134 A1 | 2/2005 | Zane et al. |
| 2005/0034048 A1 | 2/2005 | Nemawarkar et al. |
| 2005/0081091 A1 | 4/2005 | Bartfai et al. |
| 2005/0086413 A1 | 4/2005 | Lee et al. |
| 2005/0120133 A1 | 6/2005 | Slack-Smith |
| 2005/0131964 A1 | 6/2005 | Saxena |
| 2005/0240635 A1 | 10/2005 | Kapoor et al. |
| 2005/0246487 A1 | 11/2005 | Ergan et al. |
| 2006/0059428 A1 | 3/2006 | Humphries et al. |
| 2006/0064549 A1 | 3/2006 | Wintergerst |
| 2006/0085594 A1 | 4/2006 | Roberson et al. |
| 2006/0123200 A1 | 6/2006 | Ito et al. |
| 2006/0130063 A1 | 6/2006 | Kilian et al. |
| 2006/0161530 A1 | 7/2006 | Biswal et al. |
| 2006/0174063 A1 | 8/2006 | Soules et al. |
| 2006/0174069 A1 | 8/2006 | Shaw et al. |
| 2006/0179083 A1 | 8/2006 | Kulkarni et al. |
| 2006/0195648 A1 | 8/2006 | Chandrasekaran et al. |
| 2006/0212795 A1 | 9/2006 | Cottrille et al. |
| 2006/0218210 A1 * | 9/2006 | Sarma et al. ............ 707/204 |
| 2006/0242163 A1 | 10/2006 | Miller et al. |
| 2006/0253724 A1 | 11/2006 | Zhang |
| 2007/0038794 A1 | 2/2007 | Purcell et al. |
| 2007/0043790 A1 | 2/2007 | Kryger |
| 2007/0043860 A1 | 2/2007 | Pabari |
| 2007/0073896 A1 | 3/2007 | Rothman et al. |
| 2007/0143368 A1 | 6/2007 | Lundsgaard et al. |
| 2007/0156842 A1 | 7/2007 | Vermeulen et al. |
| 2007/0174541 A1 | 7/2007 | Chandrasekaran et al. |
| 2007/0234182 A1 | 10/2007 | Wickeraad et al. |
| 2007/0276784 A1 | 11/2007 | Piedmonte |
| 2007/0283079 A1 | 12/2007 | Iwamura et al. |
| 2007/0288692 A1 | 12/2007 | Bruce et al. |
| 2007/0288792 A1 | 12/2007 | Thorpe et al. |
| 2007/0294564 A1 | 12/2007 | Reddin et al. |
| 2007/0299816 A1 | 12/2007 | Arora et al. |
| 2008/0016300 A1 | 1/2008 | Yim et al. |
| 2008/0034076 A1 | 2/2008 | Ishikawa et al. |

(56) References Cited

U.S. PATENT DOCUMENTS

| | | | |
|---|---|---|---|
| 2008/0034174 A1 | 2/2008 | Traister et al. | |
| 2008/0034249 A1 | 2/2008 | Husain et al. | |
| 2008/0046538 A1 | 2/2008 | Susarla et al. | |
| 2008/0046638 A1 | 2/2008 | Maheshwari et al. | |
| 2008/0126706 A1 | 5/2008 | Newport et al. | |
| 2008/0172402 A1 | 7/2008 | Birdwell et al. | |
| 2008/0256103 A1 | 10/2008 | Fachan et al. | |
| 2008/0288713 A1 | 11/2008 | Lee et al. | |
| 2008/0295105 A1 | 11/2008 | Ozer et al. | |
| 2008/0301256 A1 | 12/2008 | McWilliams | |
| 2009/0006500 A1 | 1/2009 | Shiozawa et al. | |
| 2009/0006681 A1 | 1/2009 | Hubert et al. | |
| 2009/0006888 A1 | 1/2009 | Bernhard et al. | |
| 2009/0019456 A1 | 1/2009 | Saxena et al. | |
| 2009/0024871 A1 | 1/2009 | Emaru et al. | |
| 2009/0030943 A1 | 1/2009 | Kall | |
| 2009/0059539 A1 | 3/2009 | Ryu et al. | |
| 2009/0070530 A1 | 3/2009 | Satoyama et al. | |
| 2009/0150599 A1 | 6/2009 | Bennett | |
| 2009/0177666 A1 | 7/2009 | Kaneda | |
| 2009/0198791 A1 | 8/2009 | Menghnani | |
| 2009/0240664 A1 | 9/2009 | Dinker et al. | |
| 2009/0240869 A1 | 9/2009 | O'Krafka et al. | |
| 2009/0327751 A1 | 12/2009 | Koifman et al. | |
| 2010/0058021 A1 | 3/2010 | Kawamura | |
| 2010/0125695 A1 | 5/2010 | Wu et al. | |
| 2010/0241895 A1 | 9/2010 | Li et al. | |
| 2010/0262762 A1 | 10/2010 | Borchers et al. | |
| 2010/0299490 A1 | 11/2010 | Attarde et al. | |
| 2010/0306448 A1 | 12/2010 | Chen et al. | |
| 2010/0318821 A1 | 12/2010 | Kwan et al. | |
| 2010/0325498 A1 | 12/2010 | Nagadomi | |
| 2011/0022566 A1 | 1/2011 | Beaverson et al. | |
| 2011/0072206 A1 | 3/2011 | Ross et al. | |
| 2011/0082985 A1 | 4/2011 | Haines et al. | |
| 2011/0099420 A1 | 4/2011 | MacDonald McAlister | |
| 2011/0167038 A1 | 7/2011 | Wang et al. | |
| 2011/0179279 A1 | 7/2011 | Greevenbosch et al. | |
| 2011/0185147 A1 | 7/2011 | Hatfield et al. | |
| 2011/0191299 A1* | 8/2011 | Huynh Huu et al. | 707/646 |
| 2011/0225214 A1 | 9/2011 | Guo | |
| 2012/0005154 A1* | 1/2012 | George et al. | 707/607 |
| 2012/0072449 A1 | 3/2012 | Patch et al. | |
| 2013/0066948 A1* | 3/2013 | Colrain et al. | 709/203 |

OTHER PUBLICATIONS

Thomas et al., "Calvin: fast distributed transactions for partitioned database systems", SIGMOD '12 Proceedings of the 2012 ACM SIGMOD International Conference on Management of Data, pp. 1-12, 2012, ACM.*
Feeley et al., "Integrating coherency and recoverability in distributed systems", OSDI '94 Proceedings of the 1st USENIX conference on Operating Systems Design and Implementation, Article No. 16, 1994, ACM.*
Chandramohan et al., "Frangipani: a scalable distributed file system", SOSP '97 Proceedings of the sixteenth ACM symposium on Operating systems principles, pp. 224-237, 1997, ACM.*
Wang et al., "Log-based middleware server recovery with transaction support", The VLDB Journal Jun. 2011, vol. 20, Issue 3, pp. 347-370, 2011, Springer-Verlag.*
bsn-modulestore, Versioning Concept, Oct. 13, 2010, 2 pgs.
Btrfs, http://en.wikipedia.org, Oct. 3, 2011, 9 pgs.
Buchholz, The Structure of the Reiser File System, Jan. 26, 2006, 21 pgs.
Chacon, Git, The Fast Version Control System, Oct. 3, 2011, 3 pgs.
Email Communication from James Bodwin to Christopher Brokaw re prior art, Sep. 13, 2011, 4 pgs.
Git (Software), http://en.wikipedia.org, Oct. 3, 2011, 10 pgs.
Hitz, File System Design for an NFS File Server Appliance, Jan. 19, 1994, 23 pgs.
McDonald, Architectural Semantics for Practical Transactional Memory, Jun. 2006, 12 pgs.
McGonigle, A Short History of btrfs, Aug. 14, 2009, 11 pgs.
Mellor, ZFS—the future of file systems? Aug. 14, 2006, 5 pgs.
Mercurial, http://en.wikipedia.org, Oct. 2, 2011, 6 pages.
Module: Mongoid: Versioning, http://rdoc.info, Documentation by Yard 0.7.2, 6 pages Oct. 3, 2011.
Noach, Database Schema under Version Control, code.openarck.org, Apr. 22, 2010, 6 pages.
Reiser FS, http://enwikipedia.org, Sep. 17, 2011, 5 pgs.
Rice, Extension Versioning, Update and Compatibility, Aug. 9, 2011, 11 pgs.
Rice, Toolkit Version Format, Aug. 19, 2011, 4 pgs.
Russell, Track and Record Database Schema Versions, Jun. 28, 2005, 8 pgs.
Schooner Information Technology, IPAF, PCT/US2008/065167, Oct. 23, 2008, 7 pgs.
Schooner Information Technology, ISR/WO, PCT/US2008/065167, Jan. 28, 2009, 16 pgs.
SQL Server Database Schema Versioning and Update, Dec. 2, 2009, 2 pgs.
Sufficiently Advanced Bug, File Versioning, Caching and Hashing, Oct. 3, 2011, 3 pgs.
The Z File System (ZFS), FreeBSD Handbook, Oct. 3, 2011, 8 pgs (Author not provided).
Tux3 Linux Filesystem Project, 2008, 1 pg.
Tux3 Versioning Filesystem, Jul. 2008, 67 pgs.
Tux3, http://en.wikipedia.org, Jun. 2, 2010, 3 pgs.
Vijaykumar, Speculative Versioning Cache, Dec. 1, 2001, 13 pgs.
WAFL—Write Anywhere File Layout, 1999, 1 pg.
Write Anywhere File Layout, Sep. 9, 2011, 2 pgs.
ZFS, http://en.wikipedia.org Sep. 30, 2011, 18 pgs.
Ajmani, Automatic Software Upgrades for Distributed Systems, MIT, Sep. 2004, 164 pgs.
Chockler, Active Disk Paxos with infinitely many processes, Springer-Verlag, Apr. 2005, 12 pgs.
Dwork, Concensus in the presence of partial synchrony, MIT, 1988, 6 pgs.
Guerraoui, A Leader Election Protocol for Eventually Synchronous Shared Memory Systems, IEEE, 2006, 6 pgs.
Lamport, Cheap Paxos, Microsoft, 2004, 9 pgs.
Lamport, Fast Paxos, Microsoft, Jul. 2005, 43 pgs.
Lamport, Generalized Consensus and Paxos, Microsoft, Mar. 2004, 25 pgs.
Lamport, Paxos Made Simple, Nov. 2001, 14 pgs.
Malkhi, Lecture notes in computer science [Section: Omega Meets Paxos, Leader election and stability without eventual timely links], 2005, pp. 199-213.
Pease, Reaching Agreement in the Presence of Faults, ACM, 1980, pp. 228-234.
Schneider, Implementing fault tolerant services using the state machine, Cornell Univ., 1990, 21 pgs.
Mukherjee et al., Verification of an Industrial CC-NUMA server, Proceedings of ASP-DAC 2002, 7th Asia and South Pacifric and the 15th International Conference on VLSI Design, Jan. 7-11, 2002, 6 pages.
Shacham et al., Verificaiton of chip multiprocessor memory systems using a relaxed scoreboard, Microarchitecture, 2008, MICRO-41, 2008, 41st IEEE/ACM International Symposium, Nov. 8-12, 2008, 12 pages.
Walker, Hash Table Tutorial, Oct. 13, 2007, 14 pgs.
Unknown Author, Supermicro, "Intel Itanium Processor 9300 Series Based Server Systems," Jul. 8, 2010, http://www.supermicro.com/products/info/itanium.cfm, 3 pages.

* cited by examiner

PRIOR APPROACH

APPROACH OF AN EMBODIMENT

US 8,954,385 B2

EFFICIENT RECOVERY OF TRANSACTIONAL DATA STORES

CLAIM OF PRIORITY AND RELATED APPLICATION DATA

This application claims priority to U.S. provisional patent application No. 61/359,237, entitled "Approaches for Replication in a Distributed Transactional System Employing Solid State Devices," filed Jun. 28, 2010, invented by John Busch et al., the entire contents of which are incorporated by reference for all purposes as if fully set forth herein.

This application is related to U.S. provisional patent application No. 61/323,351, entitled "Distributed Data Access Using Solid State Storage," filed Apr. 12, 2010, invented by John Richard Busch et al., the entire contents of which are incorporated by reference for all purposes as if fully set forth herein.

This application is related to U.S. non-provisional patent application Ser. No. 12/983,754, entitled "Efficient Flash Memory-Based Object Store," filed on Jan. 3, 2011, invented by John Busch et al., the entire contents of which are incorporated by reference for all purposes as if fully set forth herein.

This application is related to U.S. non-provisional patent application Ser. No. 12/983,758, entitled "Flexible Way of Specifying Storage Attributes in a Flash Memory-Based Object Store," filed on Jan. 3, 2011, invented by Darryl Ouye et al., the entire contents of which are incorporated by reference for all purposes as if fully set forth herein.

This application is related to U.S. Non-provisional patent application Ser. No. 12/983,762, entitled "Minimizing Write Operations to a Flash Memory-Based Object Store," filed on Jan. 3, 2011, invented by Darpan Dinker, the entire contents of which are incorporated by reference for all purposes as if fully set forth herein.

This application is related to U.S. non-provisional patent application Ser. No. 13/084,368, entitled "Event Processing in a Flash Memory-Based Object Store," filed on Apr. 11, 2011, invented by Mana Krishnan, the entire contents of which are incorporated by reference for all purposes as if fully set forth herein.

This application is related to U.S. non-provisional patent application Ser. No. 13/084,432, entitled "Write Operations in a Flash Memory-Based Object Store," filed on Apr. 11, 2011, invented by Xiaonan Ma, the entire contents of which are incorporated by reference for all purposes as if fully set forth herein.

This application is related to U.S. non-provisional patent application Ser. No. 13/084,511, entitled "Recovery and Replication of a Flash Memory-Based Object Store," filed on Apr. 11, 2011, invented by Johann George, the entire contents of which are incorporated by reference for all purposes as if fully set forth herein.

FIELD OF THE INVENTION

The present invention generally relates to the efficient recovery of transactional data stores.

BACKGROUND

With the explosive growth in the number and complexity of Web 2.0 applications, software-as-a-service (SaaS), cloud computing, and other enterprise applications, datacenter workloads have increased dramatically. The business opportunities created by these new applications are substantial, but the demands they place on the datacenter are daunting.

The success of modern web sites and other enterprise applications depends heavily on the ability to effectively scale both the data tier and the caching tier on which these applications depend. Unfortunately, ordinary server, database, data store, and caching infrastructures are loosely integrated and minimally optimized. As a result, existing datacenter solutions do not adequately address the performance, capacity, scaling, reliability, and power challenges of supporting dynamic online data and services effectively.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for the efficient recovery of transactional data stores are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architecture Overview

Embodiments of the invention are directed towards the replication of write sets in a distributed transactional system. Embodiments may be employed in a wide variety of distributed transactional systems. For example, embodiments of the invention may involve the replication of write sets in many different types of distributed object stores, such as a memcached caching system, a MySQL database, or a key-value data store. Further, in certain embodiments, nodes of the distributed transactional system may chiefly or wholly employ the use of solid state devices to persistently store data.

Advantageously, the architecture of embodiments is specifically tailored for using solid state devices in a fast, efficient, and scalable manner to obtain better performance than prior approaches.

Figure 1:
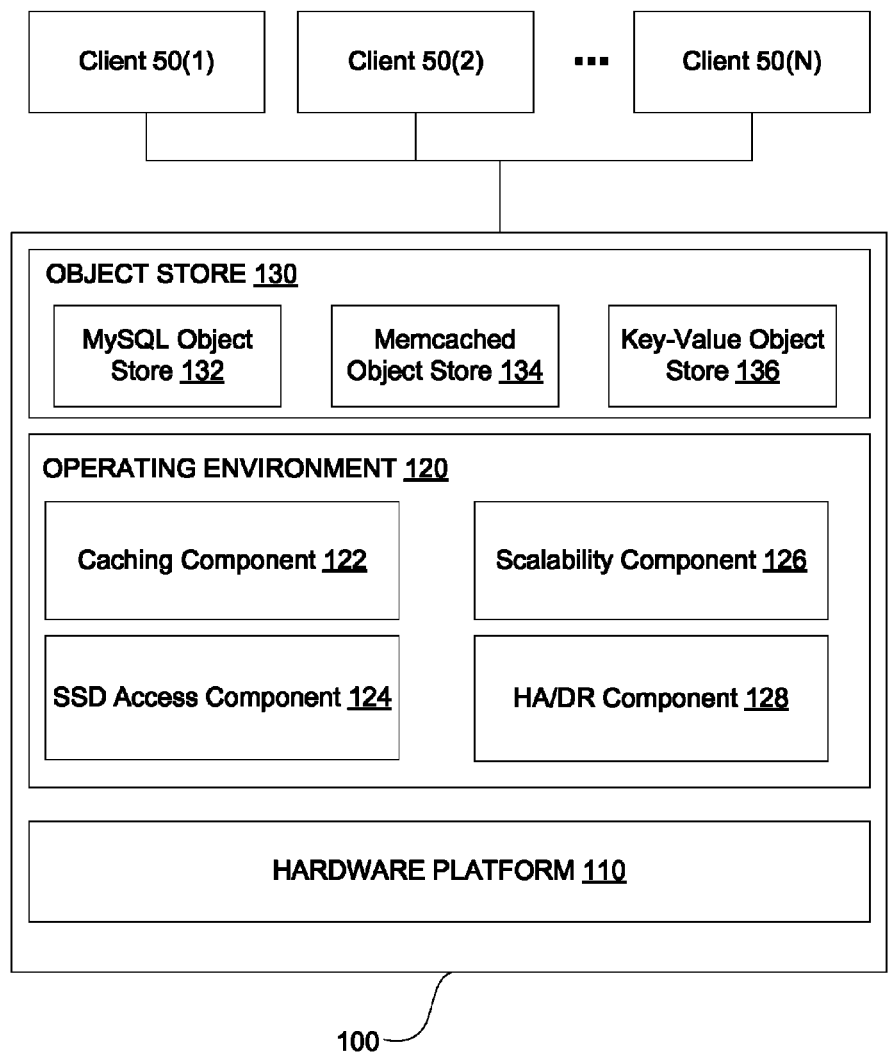
FIG. 1 is a block diagram of an illustrative system for implementing an object store, at least in part, on one or more solid state devices according to one embodiment of the invention.

FIG. 1 is a block diagram of device 100 for implementing an object store, at least in part, on one or more solid state devices according to one embodiment of the invention. In an embodiment, device 100 comprises hardware platform 110, operating environment 120, and object store 130. A commercial example of device 100 is the Schooner Appliance, available from Schooner Information Technology of Sunnyvale, Calif.

Device 100 may be used in a variety of contexts to efficiently manage large amounts of data. To illustrate the capabilities of device 100, consider FIG. 2A, which depicts a prior approach 210 in which one or more applications 212 communicate with a master database management system (DBMS) 216. In processing a request from one or more applications 212, Master DBMS 216 may issue a request for data to a pool of one or more slave DBMSs 214. To support a large number of applications 212, the total workload from the one or more applications 212 may be distributed or shared in some fashion among the one or more slave DBMSs 214. After one of the one or more slave DBMSs 214 retrieves requested data, that slave DBMS may forward the requested data to the requesting application 212.

In contrast, in the approach of embodiment 240, device 100 may perform the work of all of the one or more slave DBMSs 214. Thus, in the example of FIG. 2A, rather than deploying eight slave DBMSs, the approach of the embodiment uses a single device 100. Device 100 is able to respond quicker to requests originating from the one or more applications 212 than the slave DBMSs 214 in approach 210. Further, as a result of using one physical device rather than eight physical devices, less electricity is required, which is a substantial savings, both monetarily and in impact to the environment.

Figure 2A:
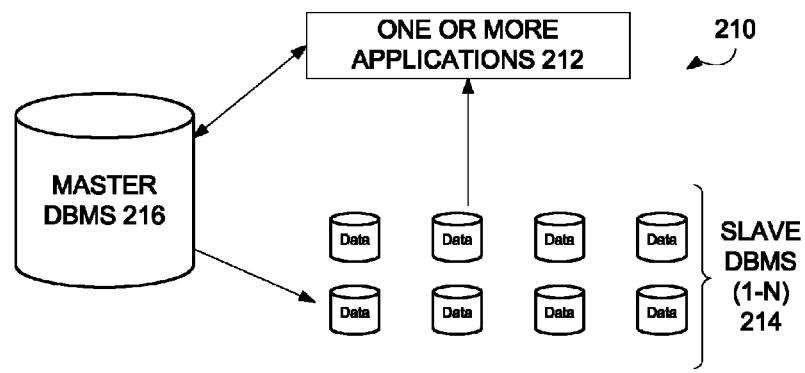
FIG. 2A is a block diagram of one example of how an object store according to one embodiment of the invention may be used.
Figure 2A:
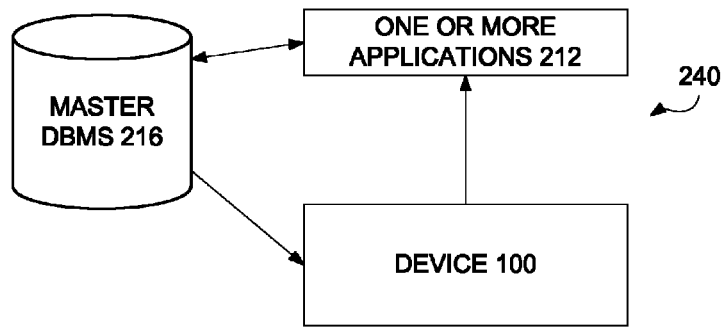
Figure 2B:
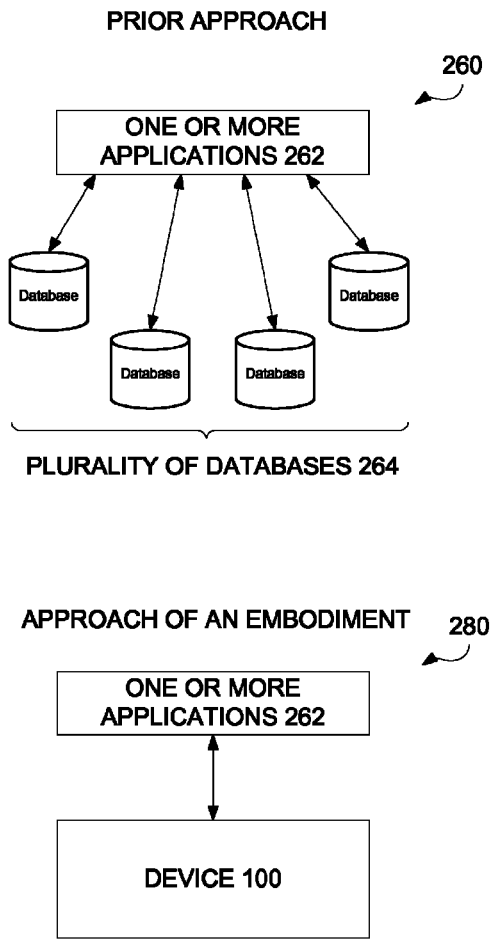
FIG. 2B is a block diagram of another example of how an object store according to one embodiment of the invention may be used.

FIG. 2B illustrates another example of how device 100 may be used. FIG. 2B depicts prior approach 260 in which one or more applications 262 communicate with a plurality of databases 264. As shown in the approach of embodiment 280, device 100 may perform the work of all of the plurality of databases 264 due to the ability of embodiments to manage large amounts of data in an object store in a fast and efficient manner. As in FIG. 2A, less electricity is required to power a single device 100 rather than all of the plurality of databases 264, which is a substantial savings, both monetarily and in impact to the environment. FIGS. 2A and 2B are not meant to depict or characterize the many ways in which device 100 may be arranged in a network to service clients or the type of data which device 100 may be used to store and manage, but rather, FIGS. 2A and 2B are meant to show how embodiments of the invention may perform work traditionally performed by a plurality of different devices.

Returning to FIG. 1, device 100 includes hardware platform 110, operating environment 120, and object store 130. Hardware platform 110 refers to the hardware components of device 100, e.g., hardware platform 110 includes one or more solid state devices. Hardware platform 110 will be described in greater detail below with reference to FIG. 3.

Operating environment 120 refers to software that is designed to support the operation of object store 130 on hardware platform 110. Operating environment 120 may be specifically tailored to operate efficiently on one or more solid state devices comprised within hardware platform 110. The embodiment of FIG. 1 depicts operating environment 120 as comprising four functional components, namely caching component 122, SSD access component 124, scalability component 126, and high availability/disaster recovery (HA/DR) component 128. The functions performed by operating environment 120 may be attributed to one of these four components in the following discussion; however, these components are merely illustrative, as other embodiments may implement the functions attributed to each of these components using a different arrangement of components. In practice, the functions attributed to these components need not be performed by a single software entity, but rather, the depiction of these components in FIG. 1 is meant to represent categories of related functions provided by the software comprising operating environment 130.

Caching component 122 refers to software components, within operating environment 120, which are responsible for performing caching services in a manner that is optimized or specifically tailored for solid state devices. Caching component 122 may support write-through and/or write-back caching.

SSD access component 124 refers to software components, within operating environment 120, which are responsible for enabling highly parallel read and write access to solid state devices. SSD access component 124 may be configured to minimize the wear of solid state devices and provide data durability with high performance. SSD access component 124 may provide redundant array of integrated disks (RAID) support.

Scalability component 126 refers to software components, within operating environment 120, which are responsible for ensuring that object store 130 may scale to support a large number of users. In certain embodiments, scalability component 126 may provide fine-grain locking, scalable and concurrent data structures, optimized thread-to-core allocation, and efficient handling of network interrupts.

HA/DR component 128 refers to software components, within operating environment 120, which are responsible for ensuring that object store 130 is highly available as well as for recovering object store 130. In an embodiment, HA/DR component 128 may perform synchronous and/or asynchronous replication of data within object store 130, perform failure detection of object store 130, automated virtual IP address (VIP) failover, perform incremental data recovery, and perform an incremental or full online backup and restore process.

As broadly used herein, object store 130 refers to software designed to store, either persistently or non-persistently, objects within an organized data store. Typically, object store 130 receives and processes requests from one or more of clients 50(1) to (N). In processing such requests, object store may store objects on or read objects from storage mediums within hardware platform 110, such as a solid state device.

Object store 130 may correspond to a variety of different types of mechanisms for storing data, such as a MySQL DBMS, a memcached object caching system, or any type of key-value data store for example. In certain embodiments, object store 130 may implement a NoSQL database while in other embodiments object store 130 may implement a traditional relational database.

In FIG. 1, for ease of explanation, object store 130 is depicted as comprising three different object stores, namely object stores 132, 134, and 136. In practice, each implementation of object store 130 may only support one type of data store, and so in practice object store 130 may only include one of object store 132, 134, and 136. However, in other embodiments of the invention, device 100 may be configured to store data by supporting a variety of different types of object store protocols, and thus object store 130 may include two or more of object stores 132, 134, and 136 to support such protocols.

MySQL object store 132 refers to a MySQL DBMS, memcached object store 134 refers to the memcached caching system, and key-value object store 136 refers to any type of key-value data store. Object store 130 may support a wide variety of different types of object stores, and so, object stores 132-136 are merely illustrative of several examples data stores of embodiments and are not intended to be a comprehensive list of all the types of data stores which may be implemented by object store 130.

Hardware Platform

Figure 3:
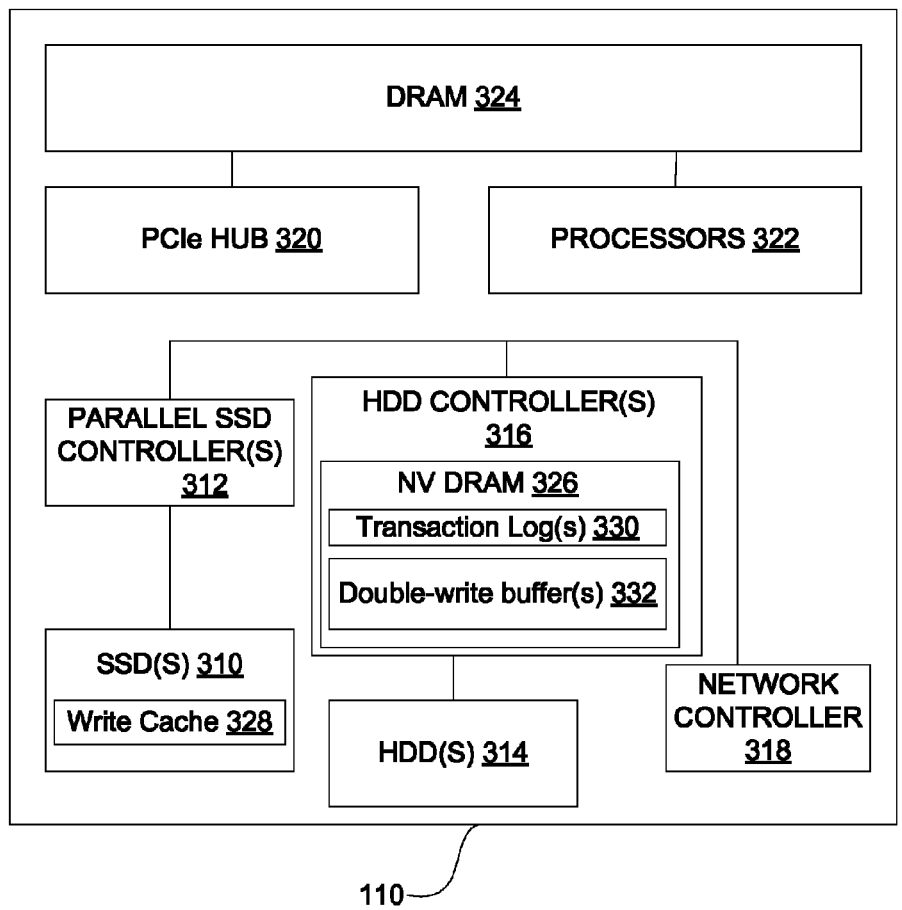
FIG. 3 is a block diagram of an illustrative hardware platform of an object store according to one embodiment of the invention.

FIG. 3 is a block diagram of hardware platform 110 of device 100 according to one embodiment of the invention. The particular hardware components shown in FIG. 3 are not meant to depict all the hardware components which may be comprised in hardware platform 110 nor are they meant to depict necessary or required components of hardware platform 110, as the hardware components shown in FIG. 3 are optional and are merely illustrative of an embodiment.

Hardware platform 110 may comprise one or more solid state devices (SSDs) 310 and one or more parallel SSD controller(s) 312. As broadly used herein, SSD(s) 310 may be implemented using any type of solid state device, although examples discussed herein shall be explained in the context of SSD(s) 310 being implemented using flash memory. Each SSD in SSD(s) 310 contains a write cache 328.

In an embodiment, hardware platform 110 may include one or more hard-disk drive(s) 314 and one or more HDD controller(s) 316. In an embodiment, each HDD controller in HDD controller(s) 316 may include a non-volatile (NV) DRAM 326. In an embodiment, NV DRAM 326 may store one or more of transaction log(s) 330 and one or more double-write buffer(s) 332 for object store 130.

NV DRAM 326 may be constructed using a DRAM which includes a battery so that if the power to the DRAM is disrupted, the battery will supply power to the DRAM, thereby ensuring that the data stored thereon may be persistently stored (at least until the battery runs out).

In an embodiment, hardware platform 110 also comprises network controller 318, PCIe HUB 320, one or more processors 322, and dynamic random access memory (DRAM) 324.

Pre-Fetching Data Blocks Involved in Replicated Write Operations

Embodiments involve the synchronous, semi-synchronous, and/or asynchronous replication of transactions performed in a distributed object store. Embodiments of the invention may comprise a plurality of nodes that may collectively be referred to as a cluster. Each node of the cluster may correspond to a machine that executes one or more instances of a transactional system. For example, each instance executing on a node of the cluster may correspond to a database management system (DBMS), a memcached application, a MySQL database, or any type of object store. Each node of a cluster may, but need not, correspond to device 100 of FIG. 1. Each node may persistently store data using one or more solid state devices (SSD), such as flash memory.

In an embodiment, a number of transactions may be performed by each instance executing on a node of the cluster. When a transaction is committed by an instance, the instance assigns to the transaction a global commit number (other names may be used to refer to a global commit number by embodiments). The global commit number is an identifier that may be used by any instance of the cluster to determine when, relative to other transactions committed by an instance of the cluster, the transaction associated with the global commit number was committed. As certain transactions may need to be applied in a particular order (since a transaction may assume or require that a prior transaction has already been committed), global commit numbers are used to ensure that replicated transactions are applied in the proper order.

Figure 4:
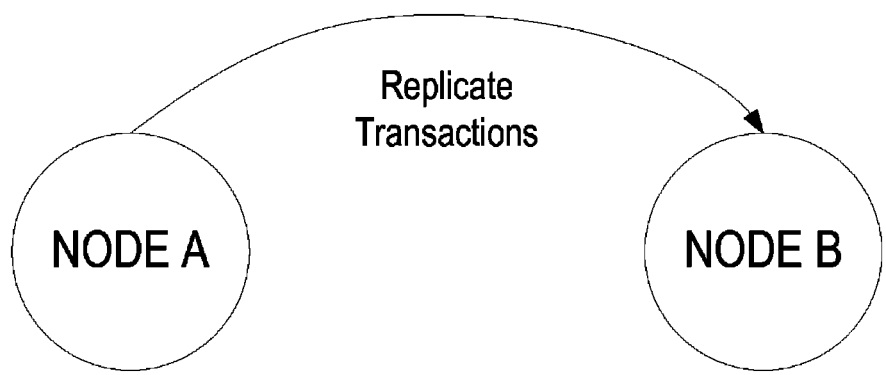
FIG. 4 illustrates two nodes of a cluster in a replication relationship according to an embodiment of the invention.

FIG. 4 illustrates two nodes of a cluster in a replication relationship according to an embodiment of the invention. The cluster may have other nodes which are not depicted in FIG. 4. Each node of the cluster may replicate committed transactions to other nodes of the cluster to ensure data consistency. For example, as shown in FIG. 4, Node A is replicating transaction 1 to Node B to ensure that data maintained by Node B reflects the same state as data maintained by Node A. In an embodiment, Node A may be configured to only replicate write operations to Node A rather than replicating both read operations and write operations to Node B. Note that it is not necessary to replicate read operations to Node B (or any node of the cluster) since read operations do not need to be performed to ensure data consistency between nodes of the cluster. Thus, in the example of FIG. 4, Node A may only replicate the two write operations to object B (namely, write B=A+3B and write B=C+2A) to Node B.

Write operations may be replicated serially from one node to another. To replicate a write operation serially, initially a write operation is sent from Node A to Node B. Node B then reads the received write operation, and determines to which object the write operation is writing. Node B next determines in which data block the object to be written is stored and then loads that data block in a buffer cache in memory. After the data block is loaded in the buffer cache, Node B then performs the write operation to object B stored in the buffer pool. Node B may then commit the transaction after the changes to object B are, in some fashion, persistently stored.

It is observed that write operations may be replicated in less time if portions of the process are performed in parallel. Thus, in an embodiment, Node B may maintain a list of write operations which have been replicated to Node B. Each of the write operations on the list is to be performed by Node B, although there is no requirement that each write operation on the list was sent to Node B from Node A, as any node of the cluster may send replicated write operations to Node B for Node B to perform. Node B may scan the list of write operations to determine which objects are written to by the write operations in the scanned portion of the list. After Node B determines which objects write operations in the scanned portion of the list reference, Node B may thereafter determine which data blocks contain objects referenced by the write operations in the scanned portion of the list. Node B may then load those data blocks into the buffer cache memory concurrently.

By loading all or most of the blocks concurrently, Node B can load in the buffer cache all or most of the data blocks which will be required to process write operations in the scanned portion of the list in roughly the same amount of time as Node B would require to load a single data block, since this process may be performed in parallel. Moreover, while Node B still needs to observe data dependencies, data blocks loaded into the buffer pool may be written to in parallel. For example, a write operation to object B and a write operation to object C may be performed in parallel, since the performance of one operation does not affect the performance of another. However, two write operations to object B should be performed in the order in which the write operations were issued—which can be determined using the global commit number.

This approach may be used in synchronous, semi-synchronous, or asynchronous replication and may be used in a variety of different types of object stores. For example, it is observed this approach has particular utility in a MySQL relational database management system (RDMS) involving asynchronous replication.

Pre-fetching data blocks in parallel is especially important in embodiments that use flash memory as the block storage system. Flash memory supports much more concurrency and IO throughput than traditional hard disk storage subsystems. To fully exploit this high throughput, the reading and writing of data blocks must be parallelized as much as possible.

Asynchronous Replication Using Write Sets

Figure 5:
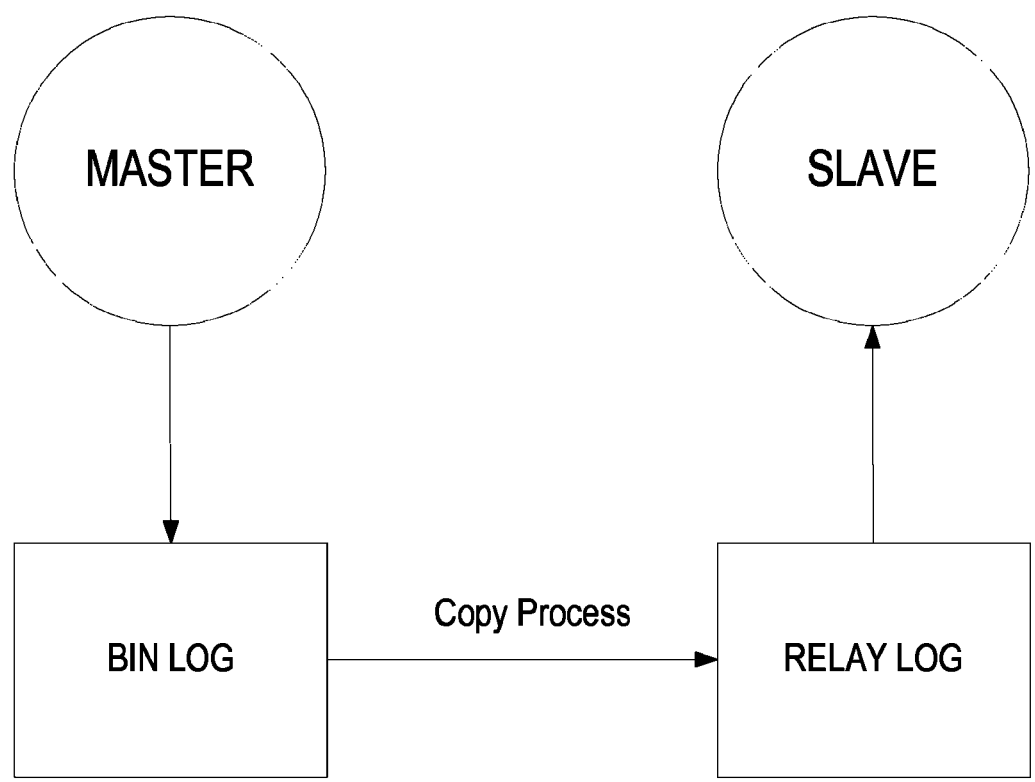
FIG. 5 illustrates a prior approach for performing asynchronous replication in a MySQL RDMS.

FIG. 5 illustrates an approach for performing asynchronous replication that is currently used by the MySQL RDMS to perform asynchronous replication. In an asynchronous replication environment, after a master commits a transaction, the master may replicate the committed transaction to the slave so that the slave may perform the transaction against its object store to ensure that the object store of both the master and the slave reflect the same state.

In a MySQL RDMS, change information that identifies changes to the object store of the master is stored in a bin log. This change information currently takes one of three forms. Change information may be (a) statement-based information that identifies the processed SQL statements, (b) row-based information that identifies the particular changes made to rows of the object store, or (c) mixed mode where statement-based information coexists with row-based information and each mode is utilized as deemed necessary. After the change information is stored in the bin log, one or more slave instances are able to read the change information from the master's bin log and save it locally to a relay log. A new slave can join the asynchronous replicated cluster by providing the binary log file name and an offset (offset represents a point in time) in the file where it can begin or continue applying updates that are read from the master. Thereafter, the relay log is read and the change information applied to the object store of the slave. After the change information is applied to the object store of the slave, the object store of the slave should reflect the state of the object store of the master at the time the change information was copied to the bin log.

It is observed that the current approach for performing asynchronous replication in a MySQL RDMS yields a variety of subtle problems that makes it difficult to ensure the states of the master's object store and the slave's object store are the same due to the nature of the change information. Embodiments of the invention overcome these limitations through the use of change information that identifies per-transaction write operations. Thus, in an embodiment, a node of the cluster logs a per-transaction write set, which is the collection of all write operations of each individual transaction that have been performed to the object store maintained at that node. Advantageously, the write operations in the log may be ordered in the logical order in which they were committed. In other words, the per-transaction write sets in the log may be ordered by the global commit number associated with each transaction. Write operations in the log may then be replayed against the object store of the slave in the same order in which the write operations were committed. As a result, asynchronous replication may be performed faster and with greater assurances of data coherency between object stores in the cluster than prior approaches.

In a MySQL RDMS, a slave communicates with the master to read from the tuple {filename, location in file referred as offset}. However, when any slave is promoted as master, the filename and location with the file may be different from the earlier master. Due to this issue, rejoining a failed-over master may include manual intervention and is error prone. The ability to use global commit number effectively solves the above stated issues by employing global commit numbers to search for a point in time in any replicated data stream, irrespective of the master or slave(s).

In one embodiment the replication stream may take the form of a network packet based stream or a file.

Grouping write operations into per-transaction write sets enables the write sets to be applied on slave nodes in parallel. Currently, databases typically require that the same thread process an entire transaction from start to finish, which makes is difficult or impossible to parallelize individual write operations within transactions. However, if write operations are grouped into per-transaction write sets, then the write sets can be processed in parallel with a dedicated thread processing each write set from start to finish.

Processing write sets in parallel may require dependency checking to ensure that data dependencies are maintained. A non-limiting, illustrative example of such dependency checking include ensuring that write operations to the same data object are performed according to global transaction commit order. Another example of dependency checking is ensuring that write operations to columns in a particular table that are used as foreign key in another "child" table are ordered with respect to writes to the "child" table. For example, table A may have a column C_A that references column C_B in table B as a foreign key. This means that any row written to table A must use a value in column C_A that already exists in column C_B in table B. Whenever an application requires a new value for column C_A that does not already exist in column C_B, it must first write the new value into table B before doing a write to table A. If a foreign key ordering constraint like this is satisfied in the global commit order on a master, this order must also be maintained when write sets are applied on slaves. Thus, when applying write operations in parallel at a node, foreign key ordering constraints should be observed and followed.

In an embodiment, enforcing the global write order on individual objects can be accomplished by comparing the object names that are touched by each write set. Only write sets that write to disjoint objects can be applied in parallel. Foreign key constraints are enforced by serializing the processing of any write sets that operate on tables with foreign key dependencies (either the parent or child table for the foreign key dependency).

As explained above, embodiments of the invention may proactively pre-fetch blocks which are referenced by write operations in a write set prior to processing the write operations in the write set.

Embodiments of the invention may employ any replication technique discussed with reference to an asynchronous replication environment in a semi-synchronous replication environment. In semi-synchronous replication, the master waits for an acknowledgement that data was received by at least one of its slaves before allowing a transaction to commit.

An advantage of write-set based replication is that slave nodes need only apply the write-sets of transactions that are committed on another node. Thus, the situation where a slave applies a portion of the write operations comprised within a write-set before the slave receives notice that the write-set has been cancelled (and thus, the slave needlessly applied the portion of write operations within that write-set) may be avoided, thereby conserving time and resources.

Another advantage is that it is more efficient to dispatch groups of updates from the master node to parallel applier threads executing on the slave node as opposed to dispatching each update individually.

Master/Slave Optimized Global Transaction Ordering

The assignment of the global commit numbers may be aided or accomplished with the use of a distributed system. For example, in FIG. 5, the master and the slave may each have a daemon (hereafter a "GCN daemon") running thereon. In preparation for committing a transaction, a global commit number may be requested via the GCN daemon. The global commit number thus globally orders the sequence of execution of each transaction in the cluster.

Currently, GCN daemons assume that a master/master replication scheme is used. In other words, GCN daemons assume that any node of a cluster could replicate transactions to other nodes of the cluster and thus leverage an ordering or consensus protocol to monotonically assign GCN through the cluster. However, it is observed that in a master/slave replication environment (that is, a unidirectional replication environment where transactions are only replicated in one direction), the algorithm used to generate the global commit numbers may be optimized using a simpler algorithm than prior approaches.

In one embodiment, the process of agreement on a global commit number between a plurality of nodes in master/slave replication arrangement is simplified and optimized by assigning a master the unique capability of generating and maintaining the GCN. In master/slave replication, the slave(s) do not explicitly start update transactions that require a commit. By not employing the multi-node GCN protocol, the network path involved and the latency of GCN assignment is eliminated, thereby making the process efficient.

In one embodiment, the process of agreement on a global commit number between a plurality of nodes in a master/master replication arrangement is optimized by assigning a node a batch of commit numbers. In the cases where a particular node has queued transactions ready for commit, the node utilizes a batch of commit numbers to make forward progress without involving a network based protocol on getting each commit number. This reduces the network patch involved in the GCN assignment and reduces the average latency of GCN assignment, thereby making the process efficient.

Reducing the complexity of assigning the global commit order can significantly increase the number of transactions that can be completed per second. It is of particular benefit in asynchronous replication applications in which there is a long communication between nodes in the cluster. Such situations arise when data centers are thousands of miles apart.

Optimizations for Recovering in a Replicated Environment

When a node of a cluster initially becomes operational, the node (hereby denoted the "recovering node") needs to update its object store to reflect the same state as the other object stores of nodes of the cluster. The object store of the recovering node may not contain any data (such as when the recovering node is powered on for the first time) or it may have a partial or incomplete set of data (for example, the recovering node may have been powered down for a period of time, thereby becoming unsynchronized with the remainder of the cluster).

Figure 6:
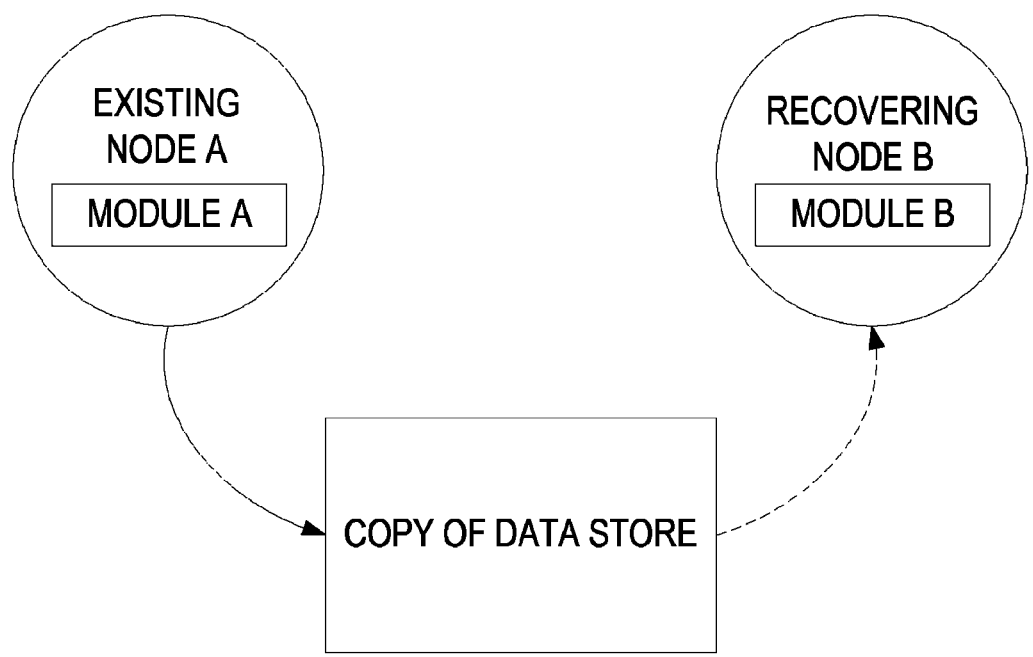
FIG. 6 illustrates a recovering node of a cluster according to an embodiment of the invention.

FIG. 6 illustrates a recovering node of a cluster according to an embodiment. In FIG. 6, a module represents one or more software applications designed to perform the functions discussed in more detail below. A non-limiting, illustrative example of a module is a MySQL instance. However, embodiments of the invention are not limited to a MySQL implementation, and other applications or processes may perform the functions attributed to module A and module B in other implementations (such as those involving other types of DBMSs or distributed caching systems, such as memcached).

Currently, to recover a node, a copy of an existing node's object store is made. For example, as depicted in FIG. 6, a copy of the object store of existing Node A is made. For this reasons, existing Node A may also be referred to herein as the donor node. Such a backup may be made using various online and offline backup or dump tools with capabilities of full and incremental backup, e.g. a third party utility for MySQL entitled "Extra Backup" or another utility entitled "rsync," which enables a copy of the object store to be stored directly on recovering Node B. Thereafter, the copy of existing Node A's object store is copied to the object store of recovering node B. Alternately, a copy of all the transactions performed against the object store of existing node A may be made, and the copy of all transaction performed against the object store of existing node A may be replayed against the object store of recovering node B. In this way, the object store of recovering Node B will reflect the same state of the object store of existing node A.

However, while the object store of recovering Node B is being updated in this fashion, the cluster ceases to accept any write requests from clients. This means that existing node A, or any other node in the cluster, cannot perform any write transactions, otherwise the object store on recovering node B will not reflect the current state of the object stores maintained in the cluster.

Embodiments of the invention address and overcome this limitation. In an embodiment, while recovering Node B is synchronizing its object store with other object stores in the cluster, existing Node A retains its ability to process transactions (including write operations as well as read operations) performed locally. In this approach, a copy of the object store of existing Node A is made. A copy of the object store of existing Node A may be stored on recovering Node B. A copy of the object store of existing Node A may be made using a third party utility, such as "Extra backup" or using other methods like LVM snapshot, etc. Before, during, and after the copying of the object store of existing Node A, existing Node A continues to perform transactions as well as send, to recovering Node B, information (denoted "committed transaction information") about transactions committed by existing Node A to enable recovering Node B to replay those transactions against the object store at recovering Node B. Module B at recovering Node B may maintain the received committed transaction information in a buffer. The buffer may reside in system DRAM or a hard-disk drive (HDD), in a solid state device (SSD), etc. Recovering Node B may initially start the buffering at DRAM and later move the buffer to alternate local storage, such as a SSD, a hard-disk drive (HDD), or the like, if the buffering requires more space than is available on the DRAM.

The copy of the object store of existing Node A is used to synchronize the object store at recovering node B. After synchronizing the object store at recovering Node B, the object store at recovering Node B will reflect the same state as the copy of the object store of existing Node A (at the earlier point in time, and earlier point in global commit order, when the copy was made). At this point, recovering Node B notes the most recent global commit number for transactions performed on the copy of the object store of existing Node A. Recovering Node B uses the most recent global commit number as a "high water mark" by (a) replaying transactions using the committed transaction information stored in the buffer maintained by module B while (b) disregarding any committed transaction information for transactions having a global commit number that is below this high water mark. Recovering Node B may safely disregard committed transaction information that fall below this "high water mark" as these transactions will already have been made to the copied object store of existing Node A. Once recovering Node B has replayed transactions using the committed transaction information maintained by module B, the object store at recovering Node B will reflect the same state as the object store in existing Node A. Note that during the time that recovering Node B is recovering (i.e., synchronizing its object store to reflect the state of other object stores in the cluster), the buffer maintained by module B will still receive committed transaction information from other nodes of the cluster.

While the description of FIG. 6 has been described with reference to two nodes, the actions performed by existing node A may be performed concurrently by any number of other nodes in the cluster. Thus, recovering Node B may simultaneously update its object store to reflect the committed transactions performed by any number of nodes in the cluster.

Embodiments of the invention support incremental recovery. If recovering Node B stores partial data (i.e., the object store at Node B stores some data, but the object store is not current), then the incremental recovery functionality allows recovering Node B to copy the difference instead of copying the entire object store from another node. To accomplish this, when recovering Node B in the cluster goes down or otherwise becomes inoperable, one of the nodes in the cluster that is operational (for example, existing Node A) starts logging replication transaction information. Recovering node B checks with existing Node A (which may involve checking with each node of the cluster sequentially or in parallel) to determine if such replication log exists, and if so, recovering Node B copies the difference rather than copying the whole object store from existing Node A.

In an embodiment, existing Node A (and naturally any and all other nodes of the cluster) may also throttle down the rate at which transactions are committed, thereby reducing the amount of transactions (and by extension the amount of time) which recovering Node B needs to process to synchronize its object store with other object stores of the cluster.

While embodiments have been described by module B reviewing committing transaction information and discarding any committed transaction information for transactions that are lower than the "high water mark," other embodiments may perform this type of review on the node replicating the committed transaction information. For example, module A on existing Node A may be configured to not replicate any committed transaction information to recovering Node B for transactions that are beneath the "high water mark."

In an embodiment, the in-memory buffer pool on the recovering node may be "pre-warmed," that is to say, may be updated to store database pages that are anticipated to be used in the near future. Most databases use an in-memory buffer pool to cache database pages that are frequently used. Since accessing main memory is much faster than accessing disk or flash storage, this dramatically improves performance. When a node is recovering, the recovering node typically starts with an empty buffer pool since no database pages have been accessed yet. Certain known recovery algorithms may be employed to load some pages into the buffer pool of the recovering node as it replays buffered transactions. However, such known recovery algorithms are not usually sufficient to fully prime the buffer pool of the recovering node.

The recovery mechanism of an embodiment of the invention can more fully prime the recovering buffer pool as compared to prior approaches by capturing the list of pages in the "donor" buffer pool at the time of recovery and pre-loading the recovering buffer pool using this list. Priming the recovering buffer pool in this way should increase the likelihood that referenced data will be found in memory in the recovering buffer pool and therefore need not be retrieved from disk. The recovering node does not have to wait for the buffer pool to be fully preloaded—the recovering node can accept client queries while the preloading is carried out concurrently in the background.

The process of transferring backup data from the donor node to the recovering node can consume most or all of the available network bandwidth between the two nodes. This can cause problems in the database cluster by "starving" other cluster management processes that share the network. For example, the cluster manager may send heartbeat messages between nodes to maintain cluster status. If the network is consumed by data transfer for recovery, then such heartbeat messages may be delayed and not be acknowledged within their timeout interval. The cluster manager may then erroneously think that a node has crashed. As another example, the cluster management console may communicate with the nodes of the cluster using the same network that is used for data transfer during recovery. If network response is severely degraded by the recovery process, cluster management operations will become unacceptably slow.

To prevent these forms of degradation from occurring, the data transfer stage of recovery can be "throttled" by limiting the fraction of network bandwidth that it can use. This ensures that there is always a certain portion of network bandwidth that is available for other cluster functions.

There are many ways to perform this throttling. One method is to pipe the network stream from the data transfer process through a bandwidth limiting utility, such as cstream, trickle, or throttle for example. Bandwidth available to the recovery process can also be limited by setting bandwidth limits in common Linux networking utilities such as iptables, the squid proxy, or tc. The bandwidth limit can be set manually or by auto-detecting the bandwidth limit of the network between the donor node and the recovering node and setting the data transfer limit to some reasonable fraction of capacity, such as 80%.

During the recovery process, while the backup is being taken and applied to the recovering node, all new write operations that are performed at any node other than the recovering node are replicated to the recovering node. For a large database, there may be many gigabytes worth of replicated write operations that must be buffered by the recovering node. Since replicate write operations are written in a serial stream, hard disks are the most cost effective medium for storing the replicated write operations. If the hard disks are configured with an intelligent disk controller that can combine many small serial writes into fewer, larger writes to the disk, very high bandwidth can be sustained. When the backup of the data store on the recovering node is complete, the writes that were buffered on disk must be retrieved and applied to the data store on the recovering node to bring the data store on the recovering node up to date with the data store maintained by the donor node. A naive implementation of this process would read each buffered write one-at-a-time and apply it to the data store on the recovering node. With hard disks as the buffering medium, however, this would be very slow because of the limited I/O rate of hard disks (typically <200 reads/sec per disk).

It is much more efficient to reduce the number of read operations to disk by reading the buffered writes in large chunks. For maximum efficiency, the read operations should be pipelined with respect to the application of the writes to the database. In other words, the next chunk(s) of buffered write operations should be pre-fetched in parallel with the application of the buffered write operations that were just retrieved. This prefetching optimization can significantly accelerate this portion of the recovery process.

While on-line recovery is taking place it is desirable to provide a measure of progress to the database administrator. This can be done as follows for each of the three phases of online recovery: In the first phase (corresponding to the backup of the data store maintained on the donor node to the recovering node), to obtain a measure of progress, initially the size of all the files to be transferred from the data store on the donor node to the recovering node is determined. Thereafter, the size of the files received on the recovering node is monitored. A percentage of size of all the files received to the size of all the files to be transferred may be determined and updated in real time. This percentage may be used to determine the progress of the first phase.

In the second phase (corresponding to applying the backup on the recovering node), the utility xtrabackup, available from Percona Inc. of Pleasanton Calif., may be used to determine how much of the apply logs has completed. This information may be used to determine the progress of the second phase.

In the third and final phase (corresponding to applying the buffered client updates to catch up the data store maintained on the recovering node to the current state of the data store maintained on the donor node), to obtain a measure of progress, initially the amount of data waiting to be applied to the data store at the recovering node is determined. This amount is roughly the size of the buffer files. The size of the data waiting to be applied may be maintained below a certain size by using flow control. As the size of the data waiting to be applied decreases, a percentage or measure of how close the process is to completion may be computed.

The measure of progress of the on-line recovery may be displayed to the administrator on a user interface to inform the administrator of how far the recovery progress has progressed. Such information is helpful to show that the recovery progress has not stalled or reached an impasse, as often the on-line recovery process may take many hours to perform.

Logical Clusters

Figure 7:
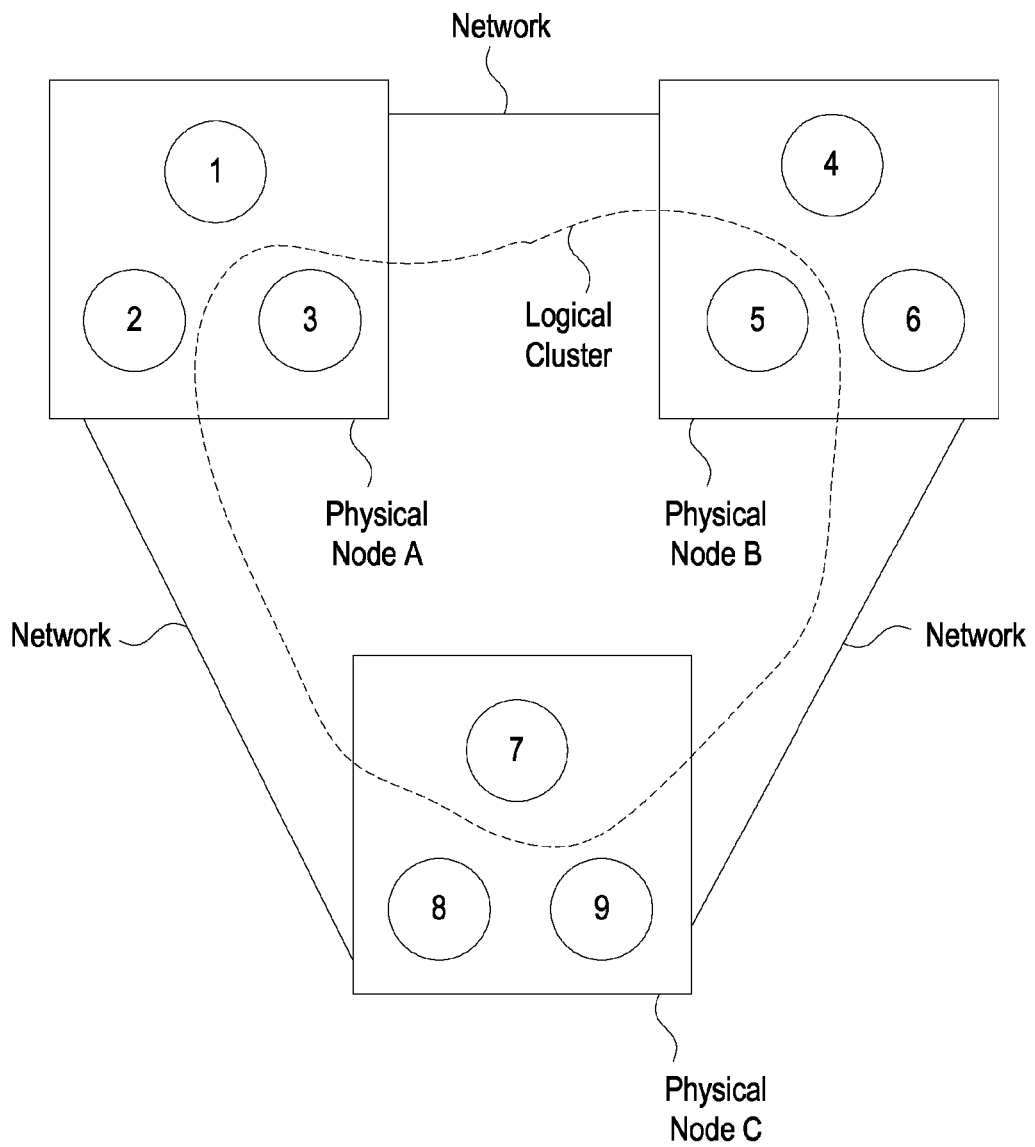
FIG. 7 depicts a logical cluster according to an embodiment of the invention.

The term cluster typically refers to a plurality of nodes that host applications that work in concert with each other. FIG. 7 depicts a potential distributed MySQL implementation where each physical node executes multiple instances, which may be MySQL instances.

FIG. 7 depicts a logical cluster comprising instances 3, 5, and 7 executing on physical nodes A, B, and C. A logical cluster is a grouping of one or more instances regardless of which physical node the instances of the logical cluster reside. Thus, the concept of logical clusters is orthogonal to physical clusters.

Logical clusters provide great flexibility in managing resources of the cluster. For example, logical clusters may be used in replication and fault tolerance. A logical cluster can be completely transparent to a user of the logical cluster.

A logical cluster may support automatic instance migration, which can be used to support manual or automatic load balancing and "autosharding." Instance migration is the process of moving an instance on one node to another different node. This is used to reduce the load on a busy server by transferring load to another less busy server. "Autosharding" is the ability to automatically split an instance on one server and migrate one of the resulting instances to another machine. Thus, if at some point an instance is running out of space and resources on a particular node, autosharding would enable the instance to grow or move to another node.

Instance migration may used to entirely move an instance from a first node to a second node, e.g., this may be desirable to facilitate maintenance on the first node. Such maintenance may include, for example, installing a new version of the database code or changing the node configuration (operating system, hardware changes, etc.). Once maintenance is complete, instance migration can be used to move the original instance back to its original home node. In an embodiment, if the instance receives a single instruction to migrate to a new location, then the instance may then copy its object store to the new location and establish a new instance at the new location.

Autosharding may be used to transfer a portion of an instance on a first node to a second node, e.g., to increase the capacity of the instance. In an embodiment, if the instance receives a single instruction to grow an instance on a first node to also be implemented on a second node, then the instance uses an algorithm to determine how to divide its object store (for example, split the keys of the object store) between the first node and the second node. The algorithm may consider the capacity and speed of the nodes, e.g., if the first node and the second node have similar speed and capacity, then the keys of the object store may be split evenly. On the other hand, if the second node has twice as much capacity and speed as the first node, then the algorithm may assign the second node to support 66% of the keys of the object store. Any approach for dividing the object store between nodes may be used by embodiments of the invention.

Autosharding may also be used to coalesce two instances to a single instance, e.g., to migrate an instance to a new node or to simplify management of the object stores. In an embodiment, if a first instance receives a single instruction to coalesce two instances to a single instance, then the first instance communicates with the second instance to determine how to merge their object stores into a single object store.

Backup Failure of an Instance

A node of a cluster may be configured to perform a scheduled backup of an object store to a different node (the "backup node"). However, if the backup node is offline or otherwise unavailable, then the scheduled backup cannot proceed.

In an embodiment embodied as a synchronous replication cluster, a node of the cluster may maintain a list of alternate backup nodes or alternate locations. If a backup node is offline or otherwise unavailable when a scheduled backup is to occur (or an instance crashes during the backup process), then the scheduled backup may be attempted at a different location in the list of alternate backup nodes or alternate locations within the cluster. The list of alternate backup nodes or locations may be prioritized so that the selection of an alternate backup node or location is made based on priority. A scheduled backup may either be a full backup or a partial (or incremental) backup of an object store.

Use of a Guaranteed Delay in Asynchronous Replication

Currently, if an administrator makes a mistake in interacting with a object store (for example, the administrator accidently deletes an object, table, or object store) of one node of a cluster supporting an asynchronous replication environment, the regrettable action will be replicated, at some point in time, even if the administrator detects the mistake prior to the mistake being replicated to other nodes of the cluster.

To address this concern, embodiments may support a configurable wait period before asynchronously replicating any transaction to another node. In this way, if a user identifies the mistake during the configurable wait period, the user may cancel the replication of the mistake and correct the mistake. The configurable wait period may be any length of time, such as one hour or one minute, for example.

It is anticipated that a configurable wait period may be used with a cluster of MySQL instances that each asynchronously replicate transaction to each other.

Hierarchical Synchronous and Asynchronous Replication

The embodiments of inventions described above for improving synchronous and asynchronous replication can be combined in a hierarchical fashion so that one synchronous cluster can be configured to replicate asynchronously to one or more synchronous clusters. Each synchronous cluster uses synchronous replication to support highly consistent, highly available storage, typically within a data center or within a metropolitan area. Asynchronous replication is used to ensure data availability across distant sites with less consistency. This is commonly used to facilitate disaster recovery. The embodiments of the inventions described above can be used to improve the performance and consistency of both the synchronous and asynchronous replication operations in such a hierarchical system.

Implementing Mechanisms

Figure 8:
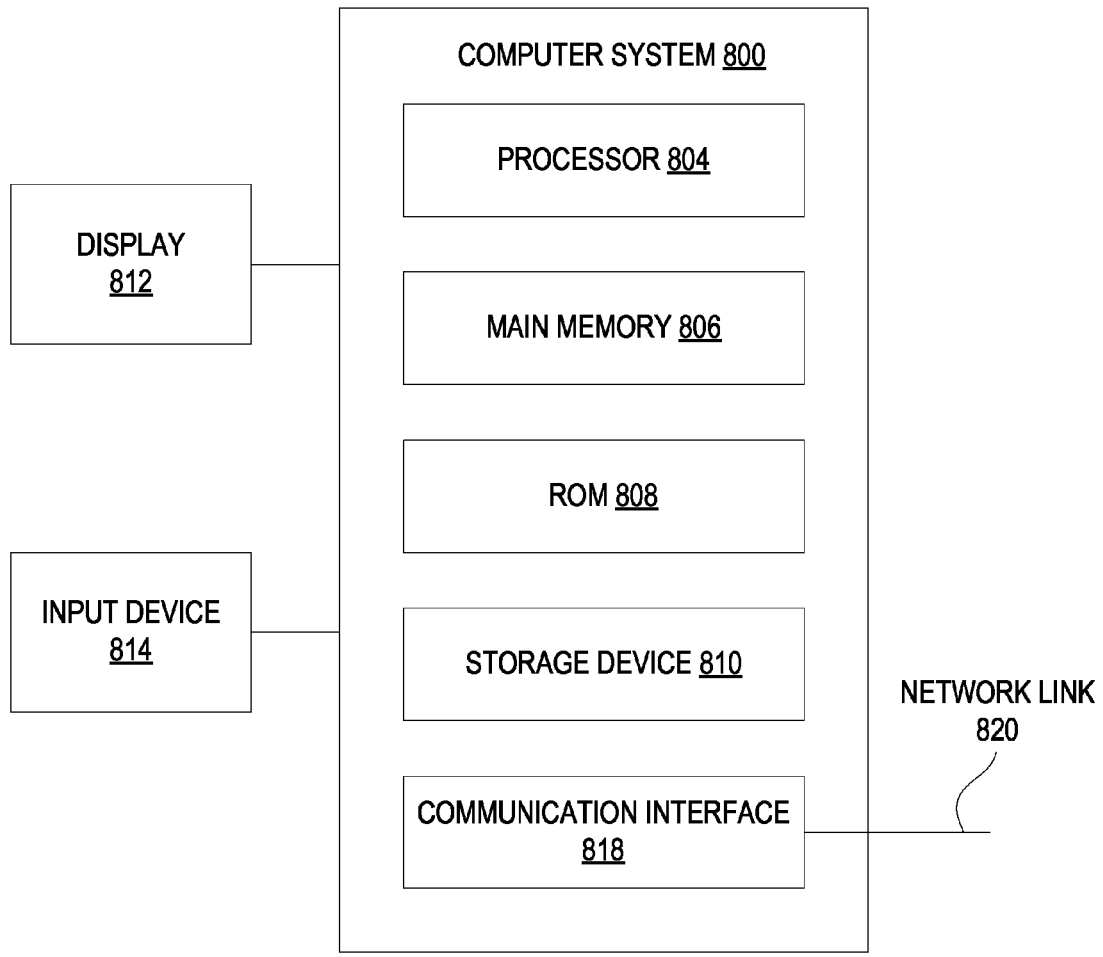
FIG. 8 is a block diagram that illustrates a computer system upon which an embodiment of the invention may be implemented.

In an embodiment, device 100 may be implemented on or using a computer system. FIG. 8 is a block diagram that illustrates a computer system 800 upon which an embodiment of the invention may be implemented. In an embodiment, computer system 400 includes processor 804, main memory 806, ROM 808, storage device 810, and communication interface 818. Computer system 800 includes at least one processor 804 for processing information. Computer system 800 also includes a main memory 806, such as a random access memory (RAM) or other dynamic storage device, for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device for storing static information and instructions for processor 804. A storage device 810, such as a magnetic disk or optical disk, is provided for storing information and instructions.

Computer system 800 may be coupled to a display 812, such as a cathode ray tube (CRT), a LCD monitor, and a television set, for displaying information to a user. An input device 814, including alphanumeric and other keys, is coupled to computer system 800 for communicating information and command selections to processor 804. Other non-limiting, illustrative examples of input device 814 include a mouse, a trackball, or cursor direction keys for communicating direction information and command selections to processor 804 and for controlling cursor movement on display 812. While only one input device 814 is depicted in FIG. 8, embodiments of the invention may include any number of input devices 814 coupled to computer system 800.

Embodiments of the invention are related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 804 for execution. For example, the instructions may initially be carried on a magnetic disk of a remote computer. The remote computer can load the instructions into its dynamic memory and send the instructions over a network link 820 to computer system 800.

Communication interface 818 provides a two-way data communication coupling to a network link 820 that is connected to a local network. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through a local network to a host computer or to data equipment operated by an Internet Service Provider (ISP).

Computer system 800 can send messages and receive data, including program code, through the network(s), network link 820 and communication interface 818. For example, a server might transmit a requested code for an application program through the Internet, a local ISP, a local network, subsequently to communication interface 818. The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of recovering a respective node of a distributed transactional system that comprises three or more nodes, the method comprising:
   at a second node of the distributed transactional system having a second set of one or more storage devices:
      receiving a copy of at least a portion of a first data store from a first node of the distributed transactional system having a first set of one or more storage devices;
      in response to receiving the copy of at least the portion of the first data store, creating a second data store based on the copy of at least the portion the first data store;
      concurrent with the second node creating the second data store:
         receiving committed transaction data from a plurality of nodes other than the second node, wherein the plurality of nodes at least includes the first node, and a third node of the distributed transactional system having a third set of one or more storage devices, and wherein the first, second, and third nodes each execute at least one distinct instance of the distributed transaction system; and
         storing the committed transaction data, wherein a respective portion of the committed transaction data describes a transaction committed against a respective data store maintained by a corresponding node of the plurality of nodes other than the second node; and
   the method further comprising, at the second node:
      identifying a reference commit number, wherein the reference commit number is a most recent global commit number for transactions committed against the copy of at least the portion of the first data store;
      identifying, from the committed transaction data stored by the second node, one or more transactions having a global commit number that is lower than or equal to the reference commit number;
      disregarding the identified one or more transactions having a global commit number that is lower than or equal to the reference commit number; and
      replaying, against the second data store, any transactions identified by the committed transaction data as having a global commit number that is greater than the reference commit number.

2. The method of claim 1, further comprising:
   the second node receiving buffer content information identifying a set of pages stored within a first in-memory buffer pool at the first node; and
   the second node pre-fetching pages within a second in-memory buffer pool maintained at the second node based upon the received buffer content information.

3. The method of claim 2, wherein the second node simultaneously pre-fetches pages into the second in-memory buffer pool while creating the second data store or replaying, against the second data store, any transactions identified by the committed transaction data received by the second node.

4. The method of claim 1, wherein the distributed transactional system maintains a bandwidth limit for recovering the respective node of the distributed transactional system; and
   the method further comprising, in response to determining that the bandwidth limit is met or exceeded, limiting an amount of network bandwidth available for recovering the respective node of the distributed transactional system.

5. The method of claim 4, wherein the amount of bandwidth available for recovering the respective node of the distributed transactional system is limited using a bandwidth limiting utility.

6. The method of claim 4, wherein the amount of bandwidth available for recovering the respective node of the distributed transactional system is limited using one or more of the following networking utilities: iptables, squid proxy, and tc.

7. The method of claim 4, wherein the amount of bandwidth available for recovering the respective node of the distributed transactional system is limited using a configurable threshold that is manually established.

8. The method of claim 4, wherein the amount of bandwidth available for recovering the respective node of the distributed transactional system is limited using a configurable threshold that is dynamically established by:
   auto-detecting the bandwidth limit of a network between the first node and the second node; and
   establishing a data transfer limit for recovering the respective node of the distributed transactional system to be a predefined percentage of the bandwidth limit of the network between the first node and the second node.

9. The method of claim 1, wherein storing the committed transaction data comprises storing the committed transaction data to hard-disk prior to the second node processing the transactions identified in the committed transaction data.

10. The method of claim 9, further comprising, the second node pre-fetching, from committed transaction data stored on the hard-disk, a plurality of buffered write operations to be processed, wherein the second node pre-fetches the plurality of buffered write operations in parallel with processing a different plurality of buffered write operations that were previously fetched from the hard-disk.

11. The method of claim 1, wherein the respective node of the distributed transactional system is the second node; and
   the method further comprising, determining a measure of progress of recovering the second node, wherein determining the measure of progress comprises:
      determining a size of the copy of the first data store;
      monitoring a size of the portion of the copy of the first data store received at the second data store; and
      periodically computing a percentage of the amount of the copy of the first data store received at the second data store relative.

12. The method of claim 1, determining a measure of progress of recovering the respective node of the distributed transactional system, wherein determining the measure of progress comprises:

determining an amount of committed transaction data stored on the hard-disk prior to reading any of the buffered write operations from the hard-disk;

monitoring a change in the amount of committed transaction data stored on the hard-disk as buffered write operations are read from the hard-disk; and periodically computing a percentage of the amount of committed transaction data read from the hard-disk.

13. The method of claim 1, wherein the first data store is persistently maintained on a first set of solid state devices;

wherein the second data store is persistently maintained on a second set of solid state devices; and the method further comprising, at the second node, prefetching one or more data blocks referenced by a plurality of buffered write operations prior to performing, in parallel, the plurality of buffered write operations against the second data store.

14. The method of claim 1, wherein the plurality of nodes other than the second node are configured to not send, to the second node, any committed transaction data for transactions having a global commit number lower than or equal to the reference commit number.

15. The method of claim 1, wherein:

the respective node of the distributed transactional system is the second node;

prior to recovering the second node, the second data store stores a partial set of data; and receiving the copy of at least the portion of the first data store, at the second node, comprises:

at the second node:

communicating with the first node to determine if the first node possesses replication logs; and upon determining that the first node possesses replication logs, instructing the first node to create a copy of the difference between the current state of the first data store and the second data store.

16. The method of claim 1, wherein the copy of at least the portion of a first data store is a full copy of the first data store.

17. A non-transitory machine-readable storage medium storing one or more sequences of instructions for recovering a respective node of a distributed transactional system that comprises three or more nodes, which when executed by one or more processors, cause the distributed transactional system to:

at a second node of the distributed transactional system having a second set of one or more storage devices:

receive a copy of at least a portion of a first data store from a first node of the distributed transactional system having a first set of one or more storage devices;

in response to receiving the copy of at least the portion of the first data store, create a second data store based on the copy of the first data store;

concurrent with the second node creating the second data store:

receive committed transaction data from a plurality of nodes other than the second node, wherein the plurality of nodes at least includes the first node, and a third node of the distributed transactional system having a third set of one or more storage devices, and wherein the first, second, and third nodes each execute at least one distinct instance of the distributed transaction system; and store the committed transaction data, wherein a respective portion of the committed transaction data describes a transaction committed against a respective data store maintained by a corresponding node of the plurality of nodes other than the second node; and the one or more sequences of instructions, further cause the second node of the distributed transaction system to:

identify a reference commit number, wherein the reference commit number is a most recent global commit number for transactions committed against the copy of at least the portion of the first data store;

identify, from the committed transaction data stored by the second node, one or more transactions having a global commit number that is lower than or equal to the reference commit number;

disregard the identified one or more transactions having a global commit number that is lower than or equal to the reference commit number; and replay, against the second data store, any transactions identified by the committed transaction data as having a global commit number that is greater than the reference commit number.

18. The storage medium of claim 17, wherein:

the respective node of the distributed transactional system is the second node;

prior to recovering the second node, the second data store stores a partial set of data; and receiving the copy of at least the portion of the first data store, at the second node, comprises:

at the second node:

communicating with the first node to determine if the first node possesses replication logs; and upon determining that the first node possesses replication logs, instructing the first node to create a copy of the difference between the current state of the first data store and the second data store.

19. A system for recovering a respective node of a distributed transactional system that comprises three or more nodes, the system comprising:

one or more processors; and a non-transitory machine-readable storage medium storing one or more sequences of instructions, which when executed by the one or more processors, cause the distributed transactional system to:

at a second node of the distributed transactional system having a second set of one or more storage devices:

receive a copy of at least a portion of a first data store from a first node of the distributed transactional system having a first set of one or more storage devices;

in response to receiving the copy of at least the portion of the first data store, create a second data store based on the copy of the first data store;

concurrent with the second node creating the second data store:

receive committed transaction data from a plurality of nodes other than the second node, wherein the plurality of nodes at least includes the first node, and a third node of the distributed transactional system having a third set of one or more storage devices, and wherein the first, second, and third nodes each execute at least one distinct instance of the distributed transaction system; and store the committed transaction data, wherein a respective portion of the committed transaction data describes a transaction committed against a respective data store maintained by a corresponding node of the plurality of nodes other than the second node; and the one or more sequences of instructions, further cause the second node of the distributed transaction system to:
  identify a reference commit number, wherein the reference commit number is a most recent global commit number for transactions committed against the copy of at least the portion of the first data store;
  identify, from the committed transaction data stored by the second node, one or more transactions having a global commit number that is lower than or equal to the reference commit number;
  disregard the identified one or more transactions having a global commit number that is lower than or equal to the reference commit number; and
  replay, against the second data store, any transactions identified by the committed transaction data as having a global commit number that is greater than the reference commit number.

20. The system of claim 19, wherein:
the respective node of the distributed transactional system is the second node;
prior to recovering the second node, the second data store stores a partial set of data; and
receiving the copy of at least the portion of the first data store, at the second node, comprises:
  at the second node:
    communicating with the first node to determine if the first node possesses replication logs; and
    upon determining that the first node possesses replication logs, instructing the first node to create a copy of the difference between the current state of the first data store and the second data store.

* * * * *